C. W. STARKER.
SHAFT BEARING.
APPLICATION FILED SEPT. 10, 1915.

1,303,408.  Patented May 13, 1919.

WITNESSES:
R. J. Cadye.
O. M. Kennedy

INVENTOR
Charles W. Starker
BY
Wesley J. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

SHAFT-BEARING.

1,303,408.   Specification of Letters Patent.   Patented May 13, 1919.

Application filed September 10, 1915. Serial No. 50,085.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Shaft-Bearings, of which the following is a specification.

My invention relates to shaft bearings for electric railway and other heavy-duty motors, and it has particular reference to the type of shaft bearings that comprises a cylindrical shell within which is provided a lining of suitable bearing metal.

The object of my invention is to provide simple and inexpensive means for preventing the rotating armature member of the motor from coming into contact with the pole pieces of the stationary field magnet in case the lining of the bearing shell melts out.

The usual construction of shaft bearings for heavy-duty motors comprises cast bearing members formed of bronze or some other suitable bearing material. Such bearings are relatively expensive to construct, but it has been found inexpedient to utilize cheaper babbitt-lined bearings on account of the liability of the bearing metal to melt under the extreme service conditions to which heavy-duty motors are subjected. Such an occurrence allows the armature of the motor to rub against the pole faces of the field magnets which results in serious damage to the armature.

By my invention, I provide a relatively inexpensive shaft bearing wherein the bearing shell is formed from ordinary pipe material and is lined with Babbitt metal. In order to prevent the armature from coming into contact with the pole faces of the field magnet in case the Babbitt metal melts out, safety strips formed of brass or other suitable bearing material having a relatively high melting point are provided within the bearing shell.

Figure 2:
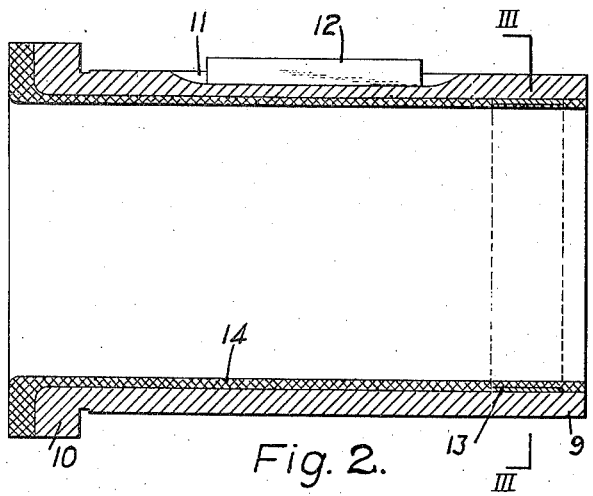
Figure 3:
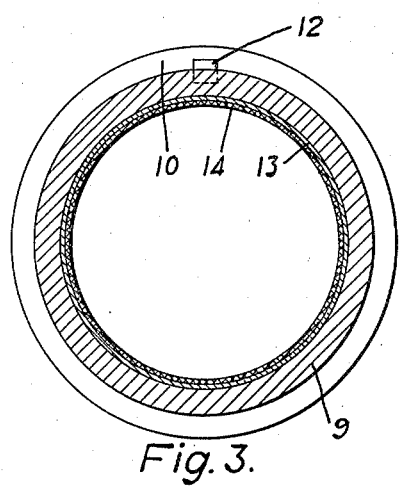
Figure 1:
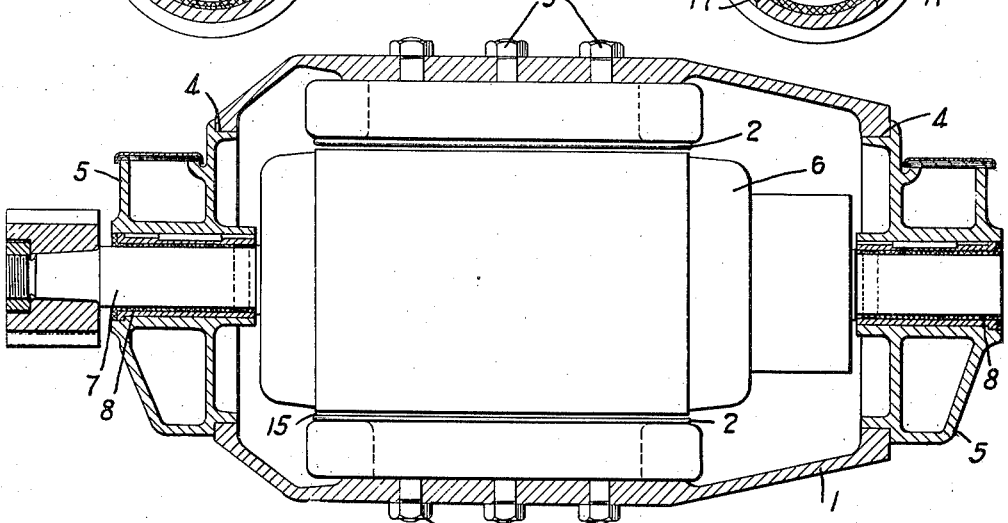

In the accompanying drawings, Figure 1 is a view, partially in section and partially in side elevation, of an electric motor provided with shaft bearings constructed in accordance with my invention. Fig. 2 is a transverse sectional view of one of the bearings shown in Fig. 1. Fig. 3 is a sectional view along the line III—III of Fig. 2, and Figs. 4 and 5 are sectional views showing modifications of my invention.

An electric motor comprises a box-type frame 1 within which are secured a plurality of field-magnet pole pieces 2 by means of bolts 3. The frame 1 is provided, at its ends, with openings 4 within which bearing housings 5 are secured in a well-known manner. An armature 6 is carried on a shaft 7 that is rotatably mounted in bearings 8 disposed within the bearing housings 5. As best shown in Fig. 2, each bearing 8 comprises a hollow cylindrical bearing shell 9 that is preferably formed from ordinary pipe material, such as wrought iron or cast steel. The walls of the pipe selected are of sufficient thickness to permit an annular flange or shoulder 10 to be formed when the remainder of the pipe is machined to the desired outside dimension, or the flange 10 may be cast thereon. The shell 9 is also provided with a keyway 11, for the reception of a suitable key 12 by means of which the bearing shell is secured within the housing 5. A ring 13, preferably composed of brass or any other other suitable bearing metal having a relatively high melting point, is pressed within the shell 9 and is secured to the inner surface thereof by welding, soldering or other similar means. The shell 9 is then lined with a layer 14 of Babbitt metal of sufficient thickness to completely embed the ring 13. As best shown in Fig. 1, the thickness of the layer 14 of Babbitt metal is also substantially equal to the air gap 15 between the armature 6 and the faces of the field-magnet pole pieces 2.

Figure 4:
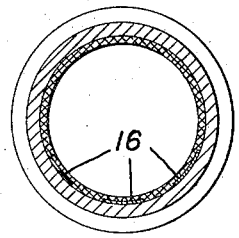
Figure 5:
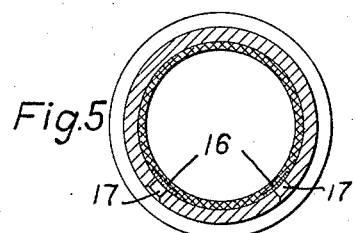

A modification of my invention is shown in Figs. 4 and 5, wherein longitudinal strips 16 of bearing metal are disposed around the inner surface of the lower half of the bearing shell 9 and are secured thereto by welding or by rivets 17.

From a consideration of the structure shown in Fig. 1, it is apparent that, if the Babbitt-metal linings of the bearings melt out by reason of excessive temperatures developed during the operation of the motor, the rings 13 or strips 16 will effectively prevent the surface of the armature 6 from coming into contact with the faces of the field-magnet pole pieces 2. It is to be understood that this is not a desirable operating condition to maintain, but the presence of the safety rings or strips will prevent damage to the armature member until such condition has been discovered. Furthermore, a considerable reduction in the cost of motor bearings may be effected by the use of my invention by reason of the fact that the bearing shells may be readily formed from ordinary pipe stock.

While I have shown my invention in a simple and preferred form and as applied to a particular type of electric motor, it is not so limited, but is susceptible of various modifications within the scope of the appended claims.

I claim as my invention:

1. A shaft bearing comprising a unitary cylindrical steel shell, a ring of bearing metal secured to the inner surface of the said shell, and a lining of Babbitt metal cast within the said shell and completely embedding the said ring of bearing metal.

2. A shaft bearing comprising a cylindrical steel shell, a brass ring secured to the inner surface of the said shell, and a lining of Babbitt metal cast within the said shell and completely embedding the said brass ring.

3. A shaft bearing comprising a hollow cylindrical shell, a ring of bearing metal having a relatively high melting point secured to the inner surface of the said shell closely adjacent to one end thereof, and a lining of bearing metal having a relatively low melting point cast within the said shell and embedding the said ring.

4. In an electric motor, the combination with a frame, a shaft disposed within said frame and bearings located at the ends of said frame for rotatably supporting said shaft, each of said bearings comprising a cylindrical shell provided with a lining of bearing metal, of bearing rings having a higher melting point than said bearing metal and embedded in said linings at the adjacent ends of said shells.

In testimony whereof, I have hereunto subscribed my name this 28th day of Aug. 1915.

CHARLES W. STARKER.